Patented Oct. 3, 1950

2,524,357

UNITED STATES PATENT OFFICE 2,524,357

HEAT-RESISTANT PAINT

Paul Robey, Elmhurst, N. Y., assignor to Socony-Vacuum Oil Company, Incorporated, a corporation of New York No Drawing. Application February 12, 1947, Serial No. 728,195

3 Claims. (Cl. 106—287)

The present invention relates to the preparation of paints having a colloidal silica base and, more particularly, to heat resistant paints having a colloidal silica solution as the vehicle.

Paints wherein colloidal silica solutions have been used as the vehicle have been known for several years. When pigmenting these silica based paints particular care must be exercised because the mechanical properties of the dry film vary greatly with the materials used for pigmentation. Various mineral pigments have been used, among which those of laminar structure have achieved greatest importance. Metallic particles have also been used as pigments. The metallic particle has been of the "leafing" type such as is used in oleo-resinous paints.

The films produced from these prior art silica based paints suffer from several disadvantages. They are quite brittle and are easily damaged mechanically. In addition, their adhesion often proves to be deficient and they have a tendency to flake-off from smooth surfaces. Films deposited from paints having colloidal silica solutions as the vehicle and "leafing" aluminum bronze as a pigment have moreover a tendency to smudge when lightly rubbed as, for example, with the finger. Thus, it is apparent that the prior art paints having colloidal silica solutions as the vehicle suffer from several deficiencies. It has now been discovered that these deficiencies of prior art silica base paints can be overcome.

It is well known to those skilled in the art that in the production of metallic pigments such as aluminum bronze the metallic particles or flakes are, as a rule, treated with a polishing agent in order to increase their interfacial tension with respect to the vehicle. As a consequence, the metallic particles in the film float to the top, arranging themselves at the surface of the film in a pattern very much like that in which shingles are applied to the roof of a building. Metallic particles which have been so treated with a polishing agent are said to be of the "leafing" type. In a dried paint film in which such "leafing" metallic particles had been used as pigment the metallic particles lie in a plane substantially parallel with the surface of the film and in an overlapping relation one to the other. In oleo-resinous paint films, a so-called "sealing action" is achieved by this arrangement, thus contributing to the durability of the film.

In distinct contrast to the "leafing" type of metallic particle, the "non-leafing" type of metallic particle is not treated with a polishing agent and, as a consequence, the particle of "non-leafing" type does not lie in a plane substantially parallel with the surface of the dried film but is distributed randomly throughout the film and at various angles other than 180 degrees with the surface of the dried film. Therefore, in an oleo-resinous paint film no sealing action is achieved by the random distribution of the "non-leafing" type of metallic particles.

In contrast, it has been found that in a film derived from a paint having colloidal silica solution as the base the "non-leafing" particles of a metallic pigment are distributed evenly throughout the whole thickness of the film, reenforcing it and providing a much stronger film than when the paint is pigmented with metallic particles of the "leafing" type. As a consequence, a film derived from a paint having a colloidal silica solution as the base and "non-leafing" metallic particles as the pigment when dry has no tendency to smudge because the metallic particles are embedded uniformly in the film instead of lying close to the surface.

It is an object of the present invention to provide metallic paints having colloidal silica solutions as the vehicle in which the metallic particles are "non-leafing." It is another object of the present invention to provide metallic paints having colloidal silica solutions as the vehicle in which the metallic particles are pretreated to provide a surface to which the silica vehicle adheres more tenaciously. It is a further object of the present invention to provide metallic paints having colloidal silica solutions as the vehicle which as dried films do not smudge appreciably and which as air dried films have improved mechanical strength. These and other objects and advantages will become apparent from the following description.

In my copending application Serial No. 728,196 filed concurrently now abandoned, I have described a novel method for producing stable solutions of colloidal silica. In the preparation of my novel metallic paints having colloidal silica solutions as the vehicle I prefer to use the novel colloidal silica solutions produced by the method disclosed in the aforesaid copending application. Briefly stated, the method for producing my novel colloidal silica solutions comprises vigorously agitating a mixture of an alkyl silicate having not more than 5 carbon atoms, preferably tetraethyl ortho silicate, or the technical product known to industry as "condensed" ethyl silicate, with an amount of water in substantial excess of that required for the complete hydrolysis of the alkyl silicate. When using the "condensed" alkyl silicate it is preferred to carry out the agitation and reaction of the "condensed" alkyl silicate and the water in the presence of a small amount of a mineral acid catalyst such as hydrochloric acid. However, when using pure alkyl silicate rather than "condensed" alkyl silicate the agitation and reaction of the silicate and the water may be carried out in the absence of the acid catalyst, although a faster reaction will be achieved in the presence of the catalyst.

After vigorous agitation of the alkyl silicate and the water a homogeneous solution is obtained containing substantially no precipitate of silica. In this solution the alkyl silicate is substantially completely hydrolyzed. From this solution in which the alkyl silicate is completely hydrolyzed a solution is prepared in which a part of the alkyl silicate is not hydrolyzed. Such a solution is referred to hereinafter as a partially hydrolyzed solution of colloidal silica. To obtain the partially hydrolyzed solution of colloidal silica an amount of alkyl silicate is added to the completely hydrolyzed solution, which amount is in substantial excess of the stoichiometric amount which can be hydrolyzed by the excess water in the completely hydrolyzed solution. It is preferred to add the additional alkyl silicate to the solution of completely hydrolyzed silica in two steps.

These partially hydrolyzed solutions are very stable and can be kept without gelling for long periods of time. In order to use them as vehicles for the metallic paints described hereinafter a sufficient amount of water should be added to hydrolyze most or all of the unhydrolyzed alkyl silicate present in the partially hydrolyzed solution of colloidal silica. This is done preferably after the metallic pigment has been dispersed in the partially hydrolyzed solution.

As stated hereinbefore, the novel paints having colloidal silica solution as the vehicle are pigmented with "non-leafing" metallic particles. The "non-leafing" metallic particles preferably are pretreated in a manner which increases the adherence of the silica binder to the "non-leafing" metallic particles. This treatment comprises subjecting the "non-leafing" metallic particles to the action of a chemical reagent that attacks the surface of the metallic particles roughening them and/or providing the "non-leafing" metallic particles with an insoluble surface deposit. Strong acids like hydrochloric acid have the desired effect: more practical treating agents have been found, however, in phosphoric acid or organic partial esters thereof. When "non-leafing" particles of aluminum are treated with phosphoric acid or, preferably, organic partial esters thereof, the colloidal silica binder or vehicle adheres far more tenaciously to the so-treated "non-leafing" particles of aluminum than to untreated "non-leafing" particles of aluminum. "Non-leafing" particles of other metallic pigments such as nickel, copper and particles of alloys of these metals, can also be used.

The preferred treating agent is selected from the group of organic partial esters of phosphoric acid; that is to say, mono- or dialkyl, mono- or diaryl and mono- or dicycloalkyl esters of phosphoric acid. The alkyl groups of these partial organic esters of phosphoric acid may have various substituent groups. While the metallic particles may be treated with a surface modifier such as described hereinbefore and selected from the group consisting of phosphoric acid and partial esters of phosphoric acid as defined hereinbefore in any suitable manner, it is preferred to add the surface modifier to a paste comprising the "non-leafing" type of particles of the metal selected for pigmentation and a solvent for the surface modifier. The solvent has to be miscible with the colloidal silica solution used as a vehicle. Such solvents are aliphatic alcohols, for example, butanol, propanol, isopropanol, or one or more of the amyl alcohols. Furthermore, an improvement in adhesion is obtained if a wetting agent that is stable in slightly acid solutions is incorporated in the paint. Among the suitable wetting agents are the "Advawets," e. g. the polymerized ethylene oxide condensation product having ether linkages obtainable under the trade name "Advawet" No. 10. Others are the "Tritons" (alkylated aryl polyether alcohols and sulfonates of the same), "Aerosols" (sulfonated esters of dicarboxylic acid and salts thereof) and "Duponols" (sulfonated alcohols and salts thereof). All of the foregoing surface active agents or wetting agents are effective in slightly acid solutions.

The novel metallic paints having colloidal silica solutions as the vehicle are prepared shortly prior to use from a paste of the surface modified "non-leafing" metallic particles and the colloidal silica solution binder. The paste of the surface modified "non-leafing" metallic particles is prepared from a suitable amount of "non-leafing" metallic particles and an alcoholic solvent such as ethanol, propanol, butanol, etc. Small amounts of phosphoric acid, or preferably partial esters thereof, as defined hereinbefore, and a surface active or wetting agent, as defined hereinbefore, are incorporated in the paste. This is most readily accomplished by dissolving the surface modifier and preferably also the surface active agent in the alcoholic solvent to which the "non-leafing" particles of metallic pigment are added and thoroughly dispersed in the solvent in an amount sufficient to provide a paste. The paste so obtained is thoroughly dispersed in a partially hydrolyzed solution of colloidal silica by agitation. Thereafter sufficient water preferably containing a small amount of mineral acid catalyst is added to hydrolyze most or all of the unhydrolyzed alkyl silicate present in the partially hydrolyzed solution of colloidal silica. It is advantageous to allow a small fraction of the alkyl silicate to remain unhydrolyzed as this small fraction is converted only into a highly condensed resinous material which improves the adhesion of the film to the surface to be coated. The paint so obtained and having as the sole vehicle preferably the novel solution of colloidal silicate described in the copending application Serial No. 728,196 may be applied by brush or by spraying equipment. It sets very rapidly, although 6 to 10 hours are required for the coatings to air dry to full hardness.

As stated hereinbefore, the films or coatings obtained from the novel paints containing the surface modified "non-leafing" metallic particles as pigment do not smudge even when rubbed with the finger under appreciable pressure after the film has dried hard. The novel paint displays good adhesion to metallic surfaces and, in distinction to prior art paints having colloidal silica solutions as the base, the novel paint is not easily damaged by abrasion nor readily scraped off. The dry films of the novel paints are so tough that they can hardly be penetrated by the finger nail and their flexibility is likewise greater than that of the prior art paints having a colloidal silica solution as the base.

A preferred embodiment of the novel paints employing the surface modified "non-leafing" metallic particles as pigment is illustrated by the following example of the preparation of an aluminum paint having a colloidal silica solution as the base.

*Example*

Paste A:

| | |
|---|---|
| "Non-leafing" aluminum powder, standard lining grade_____grams__ | 180.0 |
| Methyl phosphoric acid_____cc__ | 4.5 |
| "Advawet" No. 10_____cc__ | 2.2 |
| n-Butanol _____cc__ | 130.0 |
| Vehicle B:_____cc__ | 519.1 |
| Solution C: | |
| Water _____cc__ | 45.8 |
| Hydrochloric acid (concentrated) _cc__ | 2.4 |

Paste A is prepared preferably by dissolving the surface modifying agent, for example, methyl phosphoric acid and the surface active agent or wetting agent, for example, "Advawet" No. 10, in the alcoholic solvent, for example, n-butanol, and kneading or thoroughly mixing the metallic pigment, for example, "non-leafing" aluminum powder, with it. Preferably the paste is allowed to stand for at least about three or four hours before mixing it with the vehicle. The methyl phosphoric acid of the foregoing may be replaced by 5.0 cubic centimeters of ethyl phosphoric acid or 6.0 cubic centimeters of n-propyl phosphoric acid. The alkyl phosphoric acids which preferably are used as surface modifiers of the particles of metallic pigment are commercial products usually consisting of mixtures of primary and secondary esters.

While the Vehicle B may comprise any colloidal silica solution, it is preferred to use colloidal silica solutions prepared as described in the copending application Serial No. 728,196 and as briefly described hereinbefore. Thus, for example, Solution 1 is prepared from the following materials:

| | Volumes |
|---|---|
| "Condensed" ethyl silicate_____ | 90.0 |
| Water _____ | 18.7 |
| Hydrochloric acid (concentrated)_____ | 0.4 |

Solution 2 is prepared from the following materials:

| | Volumes |
|---|---|
| "Condensed" ethyl silicate_____ | 50.0 |
| Ethyl alcohol (95%)_____ | 60.0 |

Solution 3 comprises:

| | Volumes |
|---|---|
| "Condensed" ethyl silicate_____ | 300.0 |
| Total _____ | 519.1 |

The hydrochloric acid is dissolved in the water and with the ethyl silicate is charged to an acid resistant container provided with a high speed stirrer, a cooling jacket and a cover. The mixture is stirred vigorously until homogenous. This usually takes from about 6 to 10 minutes. The resulting homogenous solution is Solution 1. Solution 2 is mixed with Solution 1 and allowed to stand for a period of time, say overnight. Thereafter Solution 3, i. e. "condensed" ethyl silicate, is added to the mixture of Solutions 1 and 2 to provide "B" of the present example.

Paste "A" is dispersed in the Solution "B" by thorough stirring. When Paste "A" is thoroughly dispersed in the partially hydrolyzed colloidal silica Solution "B," Solution "C" is added and the stirring of the mixture continued for a short time, say a half minute to one minute. The suspension thus obtained is allowed to stand for a period of time, say about one hour. It will be noticed that during the first few minutes the temperature of the resultant suspension will rise and it is desirable to cover the container in order to avoid losses by evaporation. Before use, the paint should be stirred for a few minutes. If it is still warm it should be cooled by external means. The finished paint should be used within two or three days as caking of the pigment takes place thereafter.

While my novel paints have been illustrated by reference to a preferred embodiment, it will be understood by those skilled in the art that other "non-leafing" metal powders, like nickel flake and gold bronze, may be used. Furthermore, all grades of "non-leafing" aluminum powder may be used, including standard varnish grade, standard lining grade and extra fine lining grade. Other wetting agents stable in slightly acid solution and soluble in the vehicle may be used.

It will be noted that in the preferred embodiment of my novel metallic paint having solutions of colloidal silica as a vehicle, that partial esters of phosphoric acid are an important component of the mixture. Of the alkyl phosphoric acids, methyl, ethyl, and normal propyl phosphoric acid have given equally good results. However, normal butyl phosphoric acid while providing satisfactory results is less effective than the alkyl phosphoric acids enumerated hereinbefore. Phosphoric acid per se may be used as well as the alkyl phosphoric acids. It is to be noted, however, that while giving satisfactory results it does not produce results quite as good as the alkyl phosphoric acids. The films are not as smooth in texture and not quite as tough. It is to be noted that the specific materials, i. e. "non-leafing" metallic powder, alkyl phosphoric acid, wetting agent and alcohol, are not critical and that they may be varied, plus or minus 20-30 percent. Similarly, the ratio of paste to partially hydrolyzed solution of colloidal silica may be changed within approximately the same limits.

The use of a treating agent or surface modifier such as phosphoric acid or partial esters thereof, such as alkyl phosphoric acids, provides especially good results. This treatment probably provides a phosphate surface layer upon the metallic particles which improves their adhesion to the silica binder. A film of much greater strength and flexibility is obtained thereby. It is to be noted that films obtained from novel paints in which the "non-leafing" metallic particles have been treated with alkyl phosphoric acids, such as mixtures of primary and secondary esters, have a smoother texture than those films produced without this pretreatment of the metallic particles.

These novel metallic paints have very good mechanical strength and, in addition, excellent heat resistance. Films of these paints can be heated to red heat without damage to the film. In fact, on the contrary, the adhesion of the film to iron and steel surfaces is greatly increased by exposure to heat. This property of heat curing distinguishes these novel paints containing "non-leafing" metallic particles from mineral pigmented paints.

I claim:

1. A heat-resistant coating composition containing a vehicle consisting essentially of: a colloidal silica solution, "non-leafing" aluminum particles suspended in said vehicle, and a material selected from the group consisting of phosphoric acid and alkyl partial esters of phosphoric acid, alkyl groups of which contain up to about four carbon atoms, the quantity of said material being sufficient to increase the adhesion of said vehicle to said aluminum particles.

2. A heat-resistant coating composition consisting essentially of: a colloidal silica solution, "non-leafing" aluminum particles suspended therein, an acid-stable wetting agent and a material selected from the group consisting of phosphoric acid and alkyl partial esters of phosphoric acid, alkyl groups of which contain up to about four carbon atoms, the quantity of said material being sufficient to increase the adhesion of said vehicle to said aluminum particles.

3. A heat-resistant coating composition consisting essentially of: a vehicle consisting essentially of about 520 parts by volume of a colloidal silica solution containing about 22 per cent of silica; a pigment paste consisting essentially of about 180 parts by weight of "non-leafing" aluminum, 4.5 parts by volume of methyl phosphoric acid, an acid-stable wetting agent and solvent; and sufficient acidified water to essentially completely hydrolyze said vehicle.

PAUL ROBEY.

REFERENCES CITED

The following references are of record in the file of this patent:

UNITED STATES PATENTS

| Number | Name | Date |
| --- | --- | --- |
| 1,809,755 | King et al. | June 9, 1931 |
| 1,844,998 | Wietzel et al. | Feb. 16, 1932 |
| 2,190,548 | Pleydell-Bouverie | Feb. 13, 1940 |
| 2,258,218 | Rochow | Oct. 7, 1941 |
| 2,393,731 | Babcock | Jan. 29, 1946 |
| 2,408,654 | Kirk | Oct. 1, 1946 |

FOREIGN PATENTS

| Number | Country | Date |
| --- | --- | --- |
| 574,548 | Great Britain | Jan. 10, 1946 |

OTHER REFERENCES

"Paint Manufacture," May 1931, pages 52-55, article by King entitled "Silicon Ester as a Paint Medium."